United States Patent
Ito et al.

(10) Patent No.: US 12,296,754 B2
(45) Date of Patent: May 13, 2025

(54) INSTALLATION APPARATUS

(71) Applicant: KABUSHIKI KAISHA TOKAI-RIKA-DENKI-SEISAKUSHO, Aichi (JP)

(72) Inventors: Toshiya Ito, Aichi (JP); Ryusuke Sadamatsu, Aichi (JP); Masakazu Iwatsuki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 154 days.

(21) Appl. No.: 17/801,954

(22) PCT Filed: Feb. 1, 2021

(86) PCT No.: PCT/JP2021/003590
§ 371 (c)(1),
(2) Date: Aug. 24, 2022

(87) PCT Pub. No.: WO2021/171922
PCT Pub. Date: Sep. 2, 2021

(65) Prior Publication Data
US 2023/0082816 A1  Mar. 16, 2023

(30) Foreign Application Priority Data
Feb. 28, 2020  (JP) .................. 2020-034191

(51) Int. Cl.
*B60R 11/04* (2006.01)
*B60R 1/26* (2022.01)
*G03B 17/56* (2021.01)

(52) U.S. Cl.
CPC .............. *B60R 11/04* (2013.01); *B60R 1/26* (2022.01); *G03B 17/561* (2013.01)

(58) Field of Classification Search
CPC ............................................. B60R 2011/0082
See application file for complete search history.

(56) References Cited

U.S. PATENT DOCUMENTS

2006/0256459 A1* 11/2006 Izabel ...................... B60S 1/56
359/872
2012/0007984 A1* 1/2012 Schutz ................... B60R 11/04
348/148

(Continued)

FOREIGN PATENT DOCUMENTS

JP 2017208781 11/2017
JP 2018039453 3/2018

(Continued)

OTHER PUBLICATIONS

PCT International Search Report (with English translation) and Written Opinion for corresponding PCT Application No. PCT/JP2021/003590, mailed Apr. 13, 2021, 8 pages.

*Primary Examiner* — Noam Reisner
(74) *Attorney, Agent, or Firm* — Dority & Manning, P.A.

(57) ABSTRACT

In a camera apparatus, when an installation body is stored and a restriction mechanism of a retractor restricts the rotation of the installation body, the installation body is pressed, a knob of a return mechanism is pressed, and the rotation restriction of an operating body by the restriction mechanism is released by the return mechanism. Therefore, the installation body can be deployed.

14 Claims, 6 Drawing Sheets

(56) References Cited

U.S. PATENT DOCUMENTS

2017/0064161 A1    3/2017  Buss
2019/0118728 A1*   4/2019  Oba ..................... G06V 20/58

FOREIGN PATENT DOCUMENTS

JP    2018154301    10/2018
JP    2019131097     8/2019

* cited by examiner

INSTALLATION APPARATUS

CROSS-REFERENCE TO RELATED APPLICATIONS

The present application is related and has right of priority to JP 2020-034191, which was filed on Feb. 28, 2020 in the Japanese Patent Office, and is a U.S. national phase entry of PCT/JP2021/003590, which was filed on Feb. 1, 2021, both of which are incorporated by reference in their entireties for all purposes.

TECHNICAL FIELD

The present invention relates to an installation apparatus in which an installation body is moved to be stored or deployed.

BACKGROUND ART

In a vehicle photographing device described in Japanese Patent Application Laid-Open (JP-A) No. 2019-131097, a camera is provided at a movable member, and the movable member is moved between a protrusion position and a storage position by operating a driving unit. In the driving unit, a transmission mechanism transmits the rotational output of a motor to the movable member.

Here, in the vehicle photographing device, it is understood that the driving unit restricts the movement of the movable member in the transmission mechanism when the driving unit is not operated.

SUMMARY OF INVENTION

Technical Problem

In view of the above facts, an object of the present invention is to obtain an installation apparatus capable of permitting a movement of an installation body as necessary when a restriction mechanism restricts the movement of the installation body.

Solution to Problem

An installation apparatus according to a first aspect of the present invention includes: an installation body that is installed at a vehicle; an imaging device that is provided at the installation body and captures an image of the outside of the installation body; an operating device that is operated so that the installation body is moved to store or deploy, and that is provided with a restriction mechanism for restricting movement of the installation body when the operating device is not operated; and a release mechanism that is operated so that the movement restriction of the installation body by the restriction mechanism is released.

According to an installation apparatus according to a second aspect of the present invention, in the installation apparatus according to the first aspect of the present invention, when the installation body is stored, the installation body is stored inside the vehicle, and the release mechanism is operated to move the installation body to a deployment position side.

According to an installation apparatus according to a third aspect of the present invention, in the installation apparatus according to the first aspect or the second aspect of the present invention, the release mechanism stops movement of the installation body when the operating device is operated.

According to an installation apparatus according to a fourth aspect of the present invention, in the installation apparatus according to any one of the first to third aspects of the present invention, the release mechanism holds a position of the installation body when the release mechanism is operated.

According to an installation apparatus according to a fifth aspect of the present invention, in the installation apparatus according to any one of the first to fourth aspects of the present invention, the release mechanism is operated a plurality of times and returns to a non-operation state.

Advantageous Effects of Invention

In the installation apparatus according to the first aspect of the present invention, the installation body is installed at the vehicle, and the imaging device of the installation body captures an image of the outside of the installation body. In addition, the operating device is operated, so that the installation body is moved to be stored or deployed. Further, when the operating device is not operated, the restriction mechanism of the operating device restricts the movement of the installation body.

Here, the release mechanism is operated, so that the movement restriction of the installation body by the restriction mechanism is released. Therefore, the movement of the installation body can be permitted as necessary.

In the installation apparatus according to the second aspect of the present invention, when the installation body is stored, the installation body is stored inside the vehicle, and the release mechanism is operated to move the installation body to the deployment position side. Therefore, when the installation body is stored, the installation body can be easily moved to the deployment position side by the operation of the release mechanism, even if the installation body is stored inside the vehicle.

In the installation apparatus according to the third aspect of the present invention, the release mechanism stops the movement of the installation body when the operating device is operated. Therefore, the movement of the installation body can be stopped with a simple configuration.

In the installation apparatus according to the fourth aspect of the present invention, the release mechanism holds the position of the installation body when the release mechanism is operated. Therefore, the position of the installation body can be easily held.

In the installation apparatus according to the fifth aspect of the present invention, the release mechanism is operated a plurality of times and returns to the non-operation state. Therefore, the release mechanism can be easily returned to the non-operation state.

DESCRIPTION OF EMBODIMENTS

Figure 1A:
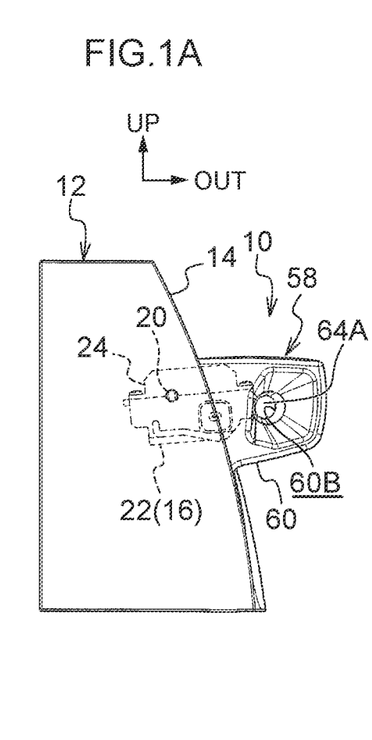
FIG. 1A is a rear view illustrating a camera apparatus according to an embodiment of the present invention as viewed from the rear side of a vehicle.
Figure 1B:
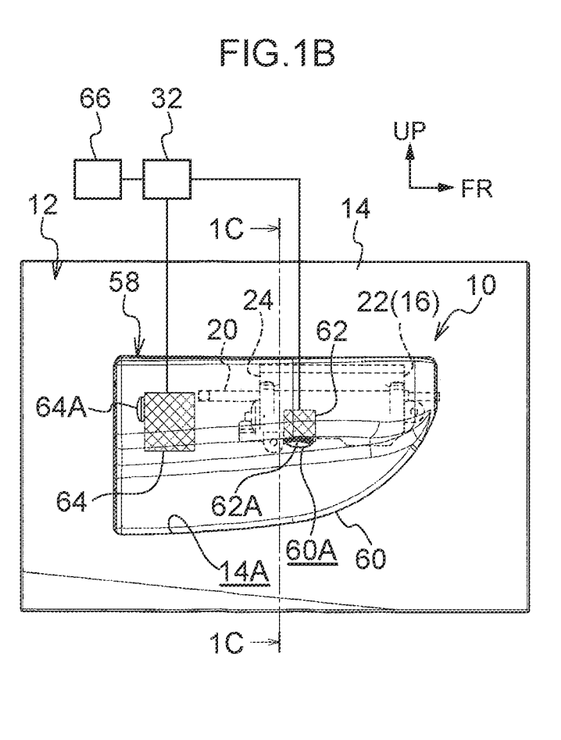
FIG. 1B is a side view illustrating the camera apparatus according to the embodiment of the present invention as viewed from a vehicle width direction outer side.
Figure 1C:
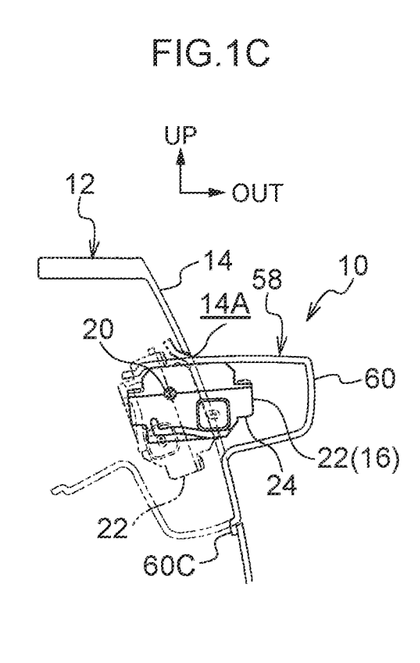
FIG. 1C is a cross-sectional view (a cross-sectional view taken along the line 1C-1C in FIG. 1B) illustrating the camera apparatus according to the embodiment of the present invention as viewed from the rear side of the vehicle.

FIG. 1A is a rear view of a camera apparatus 10 as an installation apparatus according to an embodiment of the present invention as viewed from the rear side of a vehicle. In addition, FIG. 1B is a side view of the camera apparatus 10 as viewed from a vehicle width direction outer side (the right side of the vehicle), and FIG. 1C is a cross-sectional view (a cross-sectional view taken along the line 1C-1C in FIG. 1B) of the camera apparatus 10 as viewed from the rear side of the vehicle. Note that, in the drawings, the front side of the vehicle is indicated by an arrow FR, the vehicle width direction outer side is indicated by an arrow OUT, and the upper side is indicated by an arrow UP.

As illustrated in FIGS. 1A to 1C, the camera apparatus 10 according to the present embodiment is installed on a plate-like fender panel 14 (front fender panel) as an installation target of a vehicle 12 (automobile). A substantially rectangular installation hole 14A is formed through an intermediate portion in a vertical direction of a vehicle rear side end of the fender panel 14, and the installation hole 14A extends in a vehicle front-rear direction and has a lower end inclined upward toward the vehicle front side.

Figure 3A:
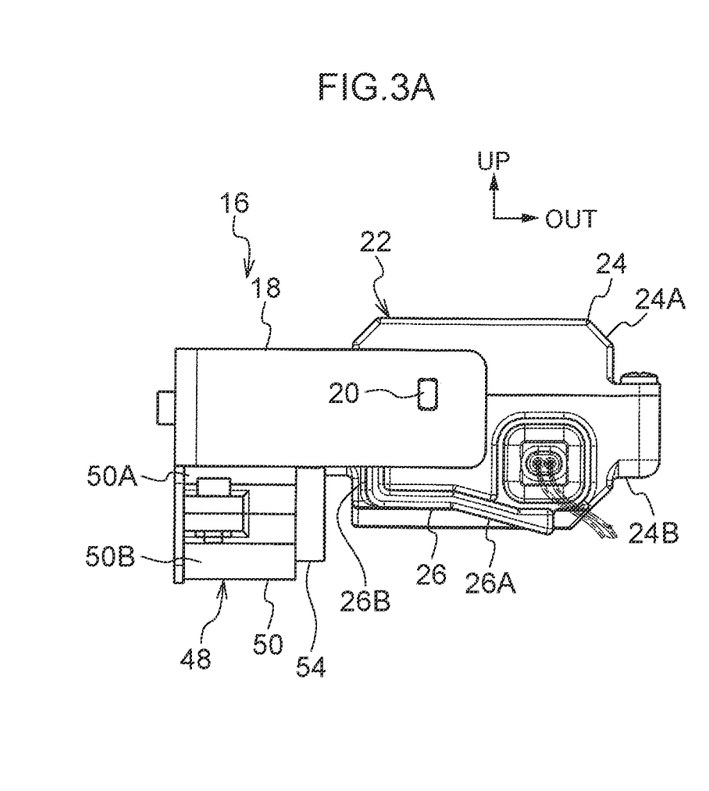
FIG. 3A is a rear view illustrating the retractor and a return mechanism when an installation body of the camera apparatus according to the embodiment of the present invention is deployed, as viewed from the rear side of the vehicle.
Figure 4A:
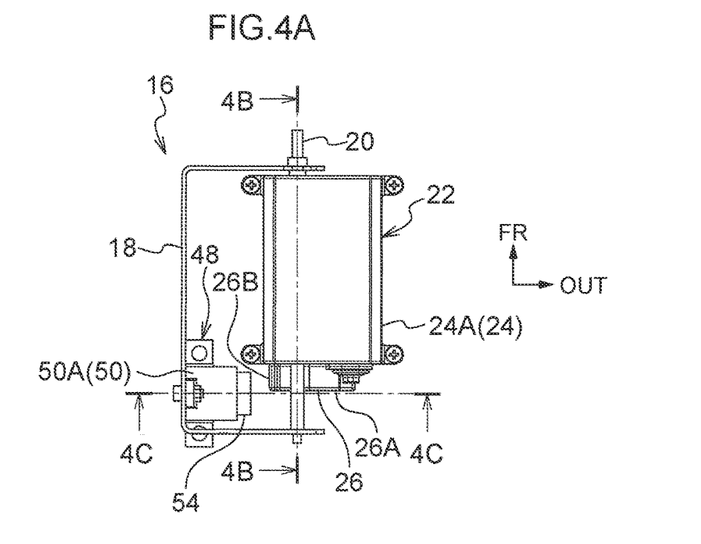
FIG. 4A is a plan view illustrating the retractor and the return mechanism of the camera apparatus according to the embodiment of the present invention as viewed from the above.

A retractor 16 (see FIGS. 2, 3A, and 4A) as an operating device is provided on a vehicle width direction inner side of the fender panel 14, and the retractor 16 is disposed on the vehicle width direction inner side of an upper portion of the installation hole 14A. The retractor 16 is provided with a plate-like bracket 18 having a U-shaped cross section in plan view, and the bracket 18 is fixed to the inner side of the fender panel 14 and has an inner portion opened to the vehicle width direction outer side. A substantially columnar shaft 20 as a support member is extended between a vehicle front side wall and a vehicle rear side wall of the bracket 18, and the shaft 20 is disposed parallel to the vehicle front-rear direction and is not rotatable.

Figure 2:
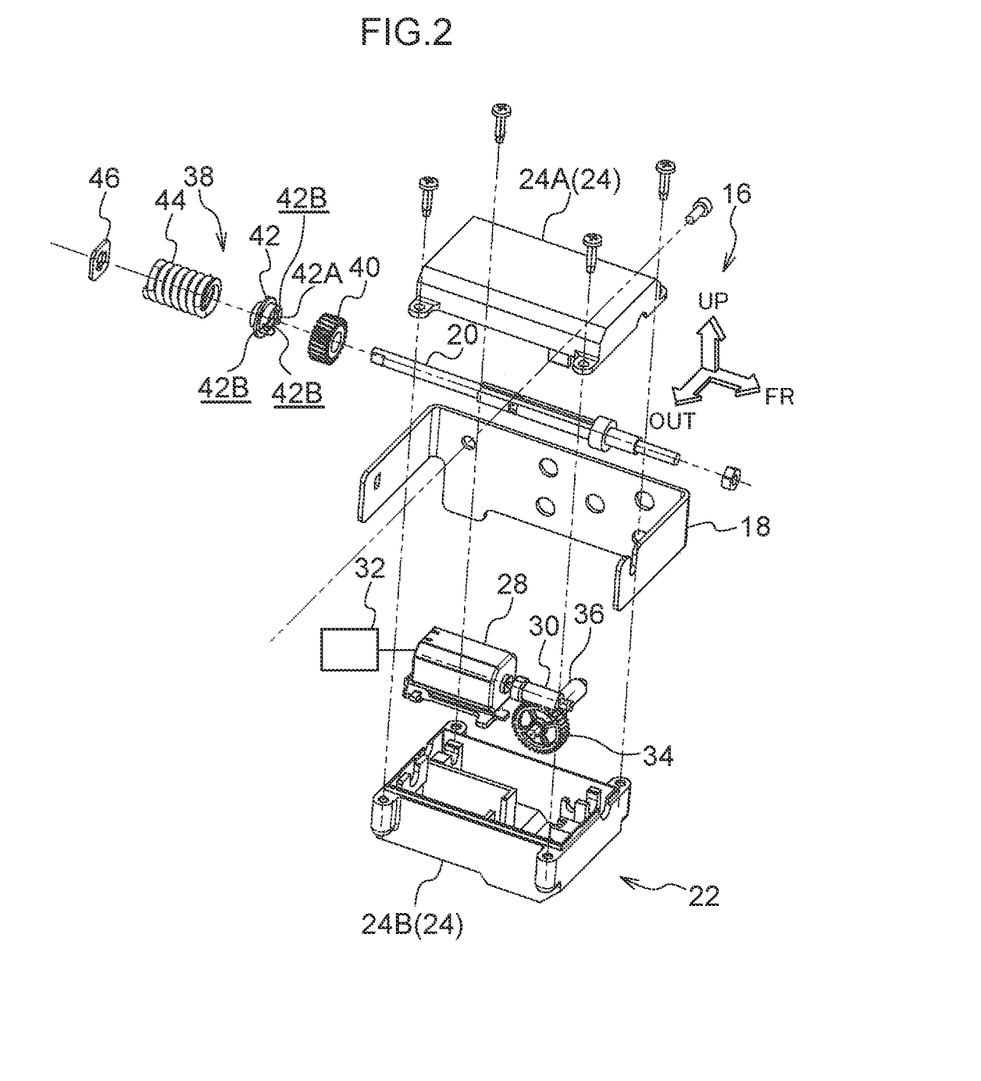
FIG. 2 is an exploded perspective view illustrating a retractor of the camera apparatus according to the embodiment of the present invention as viewed from the front side of the vehicle and the vehicle width direction outer side.

An operating body 22 having a substantially rectangular parallelepiped shape is provided in the bracket 18. A case 24 having a substantially rectangular parallelepiped box shape is provided on the outer periphery of the operating body 22, and the case 24 is configured by assembling an upper case 24A and a lower case 24B. The shaft 20 penetrates the case 24 between the upper case 24A and the lower case 24B, and the case 24 is rotatably (movably) supported by the shaft 20.

A plate-like contact plate 26 having a substantially L-shaped cross section as an abutting portion is integrally provided on a vehicle rear side surface of the case 24 (lower case 24B), and the contact plate 26 protrudes to the rear side of the vehicle. A vehicle width direction outer side portion of the contact plate 26 is a storage stopper 26A as a stop portion, and the storage stopper 26A extends downward toward the vehicle width direction outer side. A vehicle width direction inner side end of the contact plate 26 is a holding projection 26B as a holding portion, and the holding projection 26B extends upward.

In the case 24, a motor 28 as a driving device is fixed at the vehicle width direction outer side of the shaft 20, an output shaft of the motor 28 extends to the vehicle front side, and a worm 30 as a first gear constituting a transmission mechanism is coaxially fixed to the output shaft. The motor 28 is electrically connected to a control device 32 (ECU) of the vehicle 12, and the retractor 16 is operated by the control of the control device 32 to drive the motor 28 and rotate the worm 30.

A helical gear 34 (worm wheel) as a second gear constituting the transmission mechanism is meshed with the lower side of the worm 30, and the helical gear 34 is rotatably supported in the case 24 and is disposed such that an axial direction is parallel to the vehicle width direction. The worm 30 restricts the rotation of the helical gear 34, and the helical gear 34 is rotated by the rotation of the worm 30. A worm shaft 36 (worm, see FIG. 4B) as a third gear constituting the transmission mechanism is coaxially provided on the vehicle width direction inner side of the helical gear 34, and the worm shaft 36 is rotatably supported in the case 24 and integrally rotated with the helical gear 34.

The shaft 20 is provided with a restriction mechanism 38 (see FIG. 4B), and the restriction mechanism 38 is disposed in the case 24.

Figure 4B:
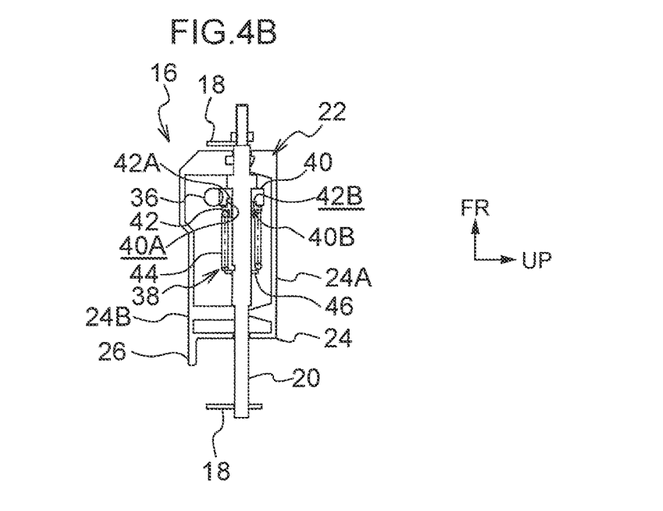
FIG. 4B is a cross-sectional view (a cross-sectional view taken along the line 4B-4B in FIG. 4A) illustrating the retractor of the camera apparatus according to the embodiment of the present invention as viewed from a vehicle width direction inner side.

The restriction mechanism 38 is provided with a restriction gear 40 (worm wheel) as a restricted member, the shaft 20 coaxially penetrates the restriction gear 40, and the restriction gear 40 is rotatably supported by the shaft 20 and is restricted from moving to the vehicle front side. The worm shaft 36 of the operating body 22 is meshed with the restriction gear 40, and the worm shaft 36 is rotatable integrally with the restriction gear 40 around the shaft 20. In the restriction gear 40, a cylindrical insertion hole 40A is coaxially formed at the radially outer side of the shaft 20, and the insertion hole 40A is opened to the rear side of the vehicle. A plurality of (three in the present embodiment) restriction convex portions 40B are integrally formed on a vehicle front side surface (bottom surface) of the insertion hole 40A, and the plurality of restriction convex portions 40B are disposed at equal intervals in a circumferential direction of the insertion hole 40A. A cross section of the restriction convex portion 40B along the circumferential direction of the insertion hole 40A is trapezoidal, and a dimension of the restriction convex portion 40B in the circumferential direction of the insertion hole 40A decreases toward the rear side of the vehicle.

The restriction mechanism 38 is provided with a substantially cylindrical clutch plate 42 as a restriction member, and the clutch plate 42 is disposed on the vehicle rear side of the restriction gear 40. The shaft 20 is coaxially inserted and fitted into the clutch plate 42, and the clutch plate 42 is supported by the shaft 20 so as to be non-rotatable and movable in the axial direction (vehicle front-rear direction). A cylindrical insertion cylinder 42A is coaxially formed in a vehicle front side portion of the clutch plate 42, and the insertion cylinder 42A is fitted into the insertion hole 40A of the restriction gear 40. A plurality of (three in the present embodiment) restriction recessed portions 42B are formed to penetrate a peripheral wall of the insertion cylinder 42A, and the plurality of restriction recessed portions 42B are disposed at equal intervals in the circumferential direction of the insertion cylinder 42A. A cross section of the restriction recessed portion 42B along the circumferential direction of the insertion cylinder 42A is trapezoidal, and a dimension of the restriction recessed portion 42B in the circumferential direction of the insertion cylinder 42A increases toward the vehicle front side. The restriction recessed portion 42B is opened to the vehicle front side, and the restriction convex portion 40B of the insertion hole 40A is fitted into the restriction recessed portion 42B.

A restriction spring 44 (compression coil spring) as a restriction biasing member is provided on the vehicle rear side of the clutch plate 42, and the shaft 20 is coaxially inserted into the restriction spring 44. A cam plate 46 having a substantially rectangular plate shape as a locking member is provided on the vehicle rear side of the restriction spring 44, the shaft 20 coaxially penetrates the cam plate 46, and the cam plate 46 is supported by the shaft 20 so as not to move in the axial direction (vehicle front-rear direction). The restriction spring 44 is compressed in the axial direction (vehicle front-rear direction) between the clutch plate 42 and the cam plate 46, and the restriction spring 44 biases the clutch plate 42 toward the vehicle front side to restrict releasing of the fitting of the restriction convex portion 40B of the restriction gear 40 (insertion hole 40A) into the restriction recessed portion 42B of the clutch plate 42 (insertion cylinder 42A), thereby restricting the rotation of the restriction gear 40. Therefore, integral rotation of the worm shaft 36 with the restriction gear 40 is restricted, and rotation (movement) of the operating body 22 (including the case 24, the motor 28, the worm 30, the helical gear 34, and the worm shaft 36) around the shaft 20 is restricted.

When the retractor 16 is operated and the worm shaft 36 is rotated as described above, a rotational force of the worm shaft 36 is applied to the restriction gear 40, and the worm shaft 36 is rotated (revolved) around the restriction gear 40, so that the operating body 22 is rotated around the shaft 20. When a rotational load of a predetermined load (load larger than the rotational load of the operating body 22 by operating of the retractor 16) or more is applied to the operating body 22, the fitting of the restriction convex portion 40B into the restriction recessed portion 42B is released while the clutch plate 42 is moved to the vehicle rear side against the biasing force of the restriction spring 44, and the restriction gear 40 is rotated, so that the worm shaft 36 is integrally rotated with the restriction gear 40, and the operating body 22 is rotated around the shaft 20.

A return mechanism 48 (see FIGS. 3A, 4A, and 5A) as a release mechanism is provided in the bracket 18, and the return mechanism 48 is disposed on the vehicle width direction inner side of the contact plate 26 of the operating body 22 (case 24).

Figure 4C:
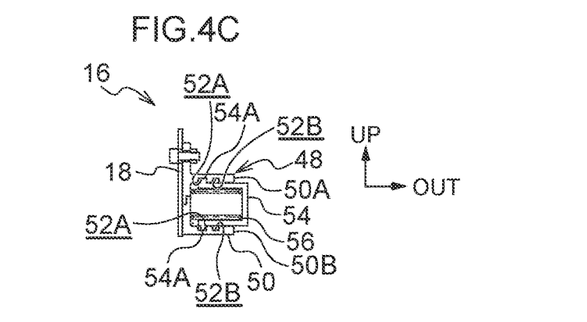
FIG. 4C is a cross-sectional view (a cross-sectional view taken along the line 4C-4C in FIG. 4A) illustrating the return mechanism of the camera apparatus according to the embodiment of the present invention as viewed from the rear side of the vehicle.

A substantially bottomed cylindrical knob case 50 as a guide member is provided on the outer periphery of the return mechanism 48, and the knob case 50 is fixed to a vehicle width direction inner side wall of the bracket 18. The knob case 50 is configured by assembling an upper first case 50A and a lower second case 50B, and the inside of the knob case 50 is opened to the vehicle width direction outer side. Recessed rails 52 (see FIGS. 4C and 5B) as guide portions are formed at an upper portion and a lower portion of an inner peripheral surface of the knob case 50, and the upper rail 52 and the lower rail 52 are in point symmetry with respect to a center axis in the knob case 50.

Figure 5A:
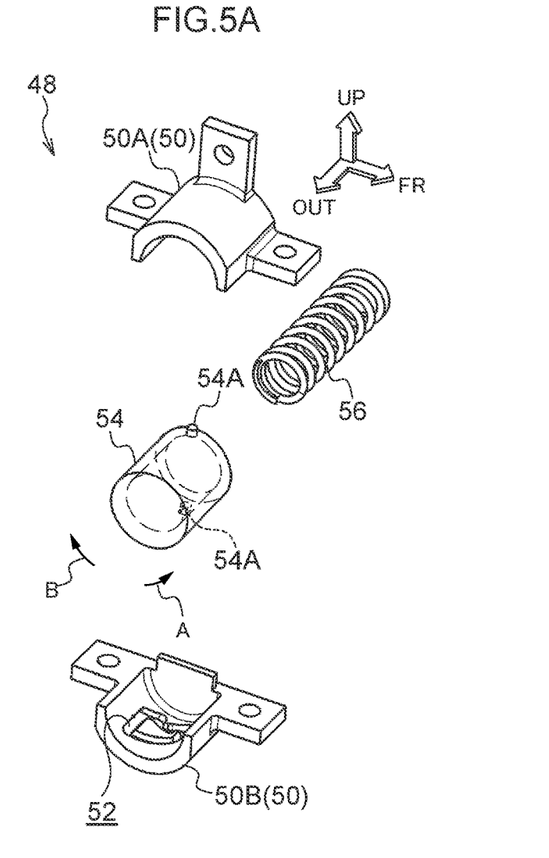
FIG. 5A is an exploded perspective view illustrating the return mechanism of the camera apparatus according to the embodiment of the present invention as viewed from the front side of the vehicle and the vehicle width direction outer side.
Figure 5B:
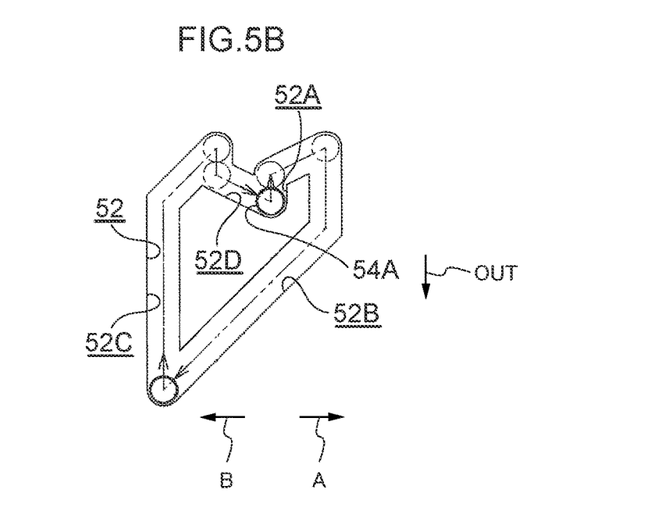
FIG. 5B is a plan view illustrating a rail and a pin of the return mechanism of the camera apparatus according to the embodiment of the present invention.

A first inner path 52A is provided on the vehicle width direction inner side of the rail 52. The first inner path 52A extends to the vehicle width direction inner side and then extends in a direction toward one direction A (a circumferential direction one side inside the knob case 50) toward the vehicle width direction inner side, from the base end side (the vehicle width direction outer side) toward the leading end side (the vehicle width direction inner side). The leading end of the first inner path 52A is connected to the base end of a first outer path 52B. The first outer path 52B extends to the vehicle width direction outer side and then extends in a direction toward the other direction B (a circumferential direction other side inside the knob case 50) toward the vehicle width direction outer side, from the base end side (the vehicle width direction inner side) toward the leading end side (the vehicle width direction outer side).

The leading end of the first outer path 52B is connected to the base end of a second inner path 52C. The second inner path 52C extends to the vehicle width direction inner side and then extends in the direction toward the one direction A toward the vehicle width direction inner side, from the base end side (the vehicle width direction outer side) toward the leading end side (the vehicle width direction inner side). The leading end of the second inner path 52C is connected to the base end of a second outer path 52D. The second outer path 52D extends to the vehicle width direction outer side and then extends in the direction toward the one direction A toward the vehicle width direction outer side, from the base end side (the vehicle width direction inner side) toward the leading end side (the vehicle width direction outer side). The leading end of the second outer path 52D is connected to the base end of the first inner path 52A, and the rail 52 is annular.

A substantially bottomed cylindrical knob 54 as an operation member is fitted into the knob case 50, and the inside of the knob 54 is opened to the vehicle width direction inner side. Columnar pins 54A (see FIGS. 4C and 5B) as guided portions are integrally provided at an upper end and a lower end in a vehicle width direction inner side end of the knob 54, and the pins 54A protrude to the radially outer side of the knob 54. The pin 54A is inserted into the base end of the first inner path 52A of the rail 52, and the movement of the pin 54A to the vehicle width direction outer side is restricted by a base end peripheral surface of the first inner path 52A, and the movement of the knob 54 to the vehicle width direction outer side is restricted.

A return spring 56 (compression coil spring) as an operation biasing member is extended between a vehicle width direction inner side wall (bottom wall) of the knob case 50 and a vehicle width direction outer side wall (bottom wall) of the knob 54, and the return spring 56 is compressed in the axial direction (vehicle width direction) to bias the knob 54 to the vehicle width direction outer side.

When the knob 54 is pressed to the vehicle width direction inner side with a pressing load equal to or larger than a specified load (load larger than the predetermined load), the pin 54A is moved from the base end to the leading end of the first inner path 52A of the rail 52 against the biasing force of the return spring 56, and the knob 54 is moved to the vehicle width direction inner side and rotated in the one direction A. Further, when the pressing operation of the knob 54 to the vehicle width direction inner side is released, the pin 54A is moved from the leading end of the first inner path 52A to the leading end of the first outer path 52B of the rail 52 by the biasing force of the return spring 56, and the knob 54 is moved to the vehicle width direction outer side and rotated in the other direction B. Therefore, the movement of the pin 54A is restricted by the leading end peripheral surface of the first outer path 52B, and the movement of the knob 54 to the vehicle width direction outer side is restricted.

Thereafter, when the knob 54 is pressed to the vehicle width direction inner side with the pressing load equal to or larger than the specified load, the pin 54A is moved from the leading end of the first outer path 52B to the leading end of the second inner path 52C of the rail 52 against the biasing force of the return spring 56, and the knob 54 is moved to the vehicle width direction inner side and rotated in the one direction A. Further, when the pressing operation of the knob 54 to the vehicle width direction inner side is released, the pin 54A is moved from the leading end of the second inner path 52C to the base end of the first inner path 52A of the rail 52 via the second outer path 52D by the biasing force of the return spring 56, and the knob 54 is moved to the vehicle width direction outer side and rotated in the one direction A. Therefore, the knob 54 is returned to the initial position.

As illustrated in FIGS. 1A to 1C, the installation body 58 is supported by the operating body 22 of the retractor 16, and the installation body 58 is rotatable integrally with the operating body 22. The installation body 58 is deployed, and the installation body 58 (an upper portion of a cover 60 to be described later) protrudes to the vehicle width direction outer side of the fender panel 14. When the retractor 16 is operated and the operating body 22 is rotated to one side, the installation body 58 is rotated to the lower side and the vehicle width direction inner side and stored (see a two-dot chain line in FIG. 1C). Further, when the retractor 16 is operated and the operating body 22 is rotated to the other side, the installation body 58 is rotated to the upper side and the vehicle width direction outer side and deployed (returned).

The cover 60 is provided at the outer periphery of the operating body 22. The upper portion of the cover 60 has a substantially rectangular parallelepiped box shape, the inside of the upper portion of the cover 60 is opened to the vehicle width direction inner side, and the upper portion of the cover 60 protrudes to the vehicle width direction outer side of the fender panel 14. The operating body 22 of the retractor 16 is fixed in the upper portion of the cover 60, so that the installation body 58 is rotatable integrally with the operating body 22. A circular lower exposure hole 60A as an exposed portion is formed to penetrate a lower wall of the upper portion of the cover 60 in a vehicle front-rear direction intermediate portion, and the lower exposure hole 60A opens the inside of the cover 60 to the lower side. A circular rear exposure hole 60B as an exposed portion is formed to penetrate a vehicle rear side wall of an upper portion of the cover 60, and the rear exposure hole 60B opens the inside of the cover 60 to the vehicle rear side.

The lower portion of the cover 60 has a substantially triangular plate shape, and a lower end of the lower portion of the cover 60 is inclined upward toward the vehicle front side. A vehicle width direction outer side surface of the lower portion of the cover 60 is disposed at a position flush with a vehicle width direction outer side surface of the fender panel 14, except for the lower end. A deployment stopper 60C is formed at the lower end of the cover 60, and the deployment stopper 60C is disposed on the vehicle width direction inner side of the fender panel 14. The deployment stopper 60C is in contact with a vehicle width direction inner side surface of the fender panel 14, so that the rotation of the installation body 58 toward the upper side and the vehicle width direction outer side is stopped.

Figure 3B:
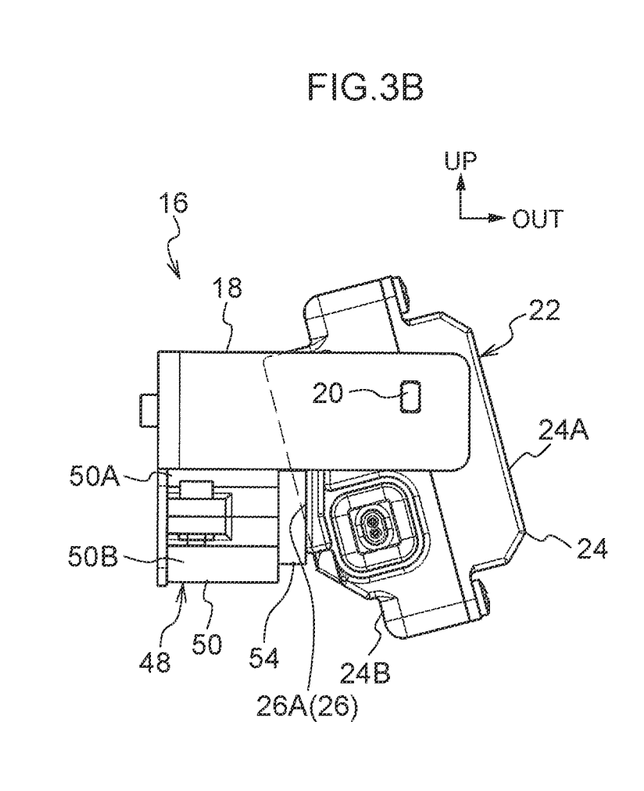
FIG. 3B is a rear view illustrating the retractor and the return mechanism when the installation body of the camera apparatus according to the embodiment of the present invention is stored, as viewed from the rear side of the vehicle.
Figure 6A:
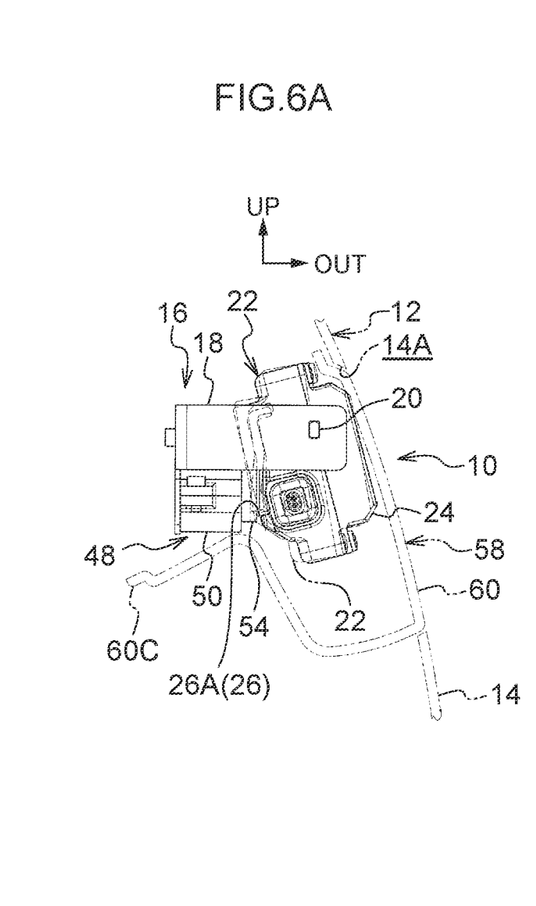
FIG. 6A is a rear view illustrating the camera apparatus according to the embodiment of the present invention when the installation body is stored as viewed from the rear side of the vehicle.

When the installation body 58 is stored, the storage stopper 26A of the contact plate 26 of the operating body 22 (case 24) is in contact (surface contact) with a vehicle width direction outer side surface of the knob 54 of the return mechanism 48, and the rotation of the installation body 58 toward the lower side and the vehicle width direction inner side is stopped (see FIGS. 3B and 6A). Further, when the installation body 58 is stored, a vehicle width direction outer side surface of the upper wall of the cover 60 is disposed at a position flush with the vehicle width direction outer side surface of the fender panel 14, so that the entire installation body 58 is stored on the vehicle width direction inner side of the fender panel 14 (the inner side of the vehicle 12), and the installation body 58 does not protrude to the vehicle width direction outer side of the fender panel 14 (see FIG. 6A).

In the upper portion of the cover 60, a lower camera 62 as an imaging device is fixed in a vehicle front-rear direction intermediate portion, and a lens 62A of the lower camera 62 is directed to the lower side and exposed to the lower side of the cover 60 through the lower exposure hole 60A of the cover 60. In the upper portion of the cover 60, a rear camera 64 as an imaging device is fixed on the vehicle rear side, and a lens 64A of the rear camera 64 is directed to the vehicle rear side and exposed to the vehicle rear side of the cover 60 through the rear exposure hole 60B of the cover 60.

The lower camera 62 and the rear camera 64 are electrically connected to the control device 32, and the lower camera 62 and the rear camera 64 capture images of the lower side and the vehicle rear side of the cover 60 via the lens 62A and the lens 64A, respectively, under the control of the control device 32. A monitor 66 as a display device is electrically connected to the control device 32, and under the control of the control device 32, the images captured by the lower camera 62 and the rear camera 64 are displayed on the monitor 66. Since the monitor 66 is installed in the vehicle interior and an occupant can confirm the images displayed on the monitor 66, visual recognition of the occupant for the lower side and the vehicle rear side is assisted.

Next, functions of the present embodiment will be described.

In the camera apparatus 10 having the above configuration, in the restriction mechanism 38 in the operating body 22 of the retractor 16, the release of the fitting of the restriction convex portion 40B of the restriction gear 40 (the insertion hole 40A) into the restriction recessed portion 42B of the clutch plate 42 (the insertion cylinder 42A) is restricted by the biasing force of the restriction spring 44, and the rotation of the restriction gear 40 is restricted. Therefore, in the operating body 22, integral rotation of the worm shaft 36 with the restriction gear 40 is restricted, and rotation of the operating body 22 (including the case 24, the motor 28, the worm 30, the helical gear 34, and the worm shaft 36) is restricted, so that rotation of the installation body 58 is restricted.

When the retractor 16 is operated by the control of the control device 32, the motor 28 is driven, and the worm 30, the helical gear 34, and the worm shaft 36 are rotated, so that the worm shaft 36 is rotated around the restriction gear 40, and the operating body 22 is rotated.

The installation body 58 is deployed, the retractor 16 is operated, and the operating body 22 is rotated to one side, so that the installation body 58 is rotated to the lower side and the vehicle width direction inner side and stored. When the installation body 58 is stored, the storage stopper 26A of the contact plate 26 of the operating body 22 (case 24) is in contact with the vehicle width direction outer side surface of the knob 54 of the return mechanism 48, and the rotation of the installation body 58 toward the lower side and the vehicle width direction inner side is stopped. When the installation body 58 is stored, the installation body 58 is stored on the vehicle width direction inner side of the fender panel 14 (the inner side of the vehicle 12), and the lower camera 62 (including the lens 62A) and the rear camera 64 (including the lens 64A) of the installation body 58 are stored on the vehicle width direction inner side of the fender panel 14, so that contamination, damage, and failure of the lower camera 62 and the rear camera 64 are suppressed.

Thereafter, the retractor 16 is operated, and the operating body 22 is rotated to the other side, so that the installation body 58 is rotated to the upper side and the vehicle width direction outer side and deployed (returned). When the installation body 58 is deployed, the deployment stopper 60C of the installation body 58 (cover 60) is in contact with the vehicle width direction inner side surface of the fender panel 14, and the rotation of the installation body 58 toward the upper side and the vehicle width direction outer side is stopped.

Incidentally, when the installation body 58 is stored and the retractor 16 cannot be operated due to a failure of the retractor 16, freezing of the installation body 58 with the fender panel 14, or the like, the installation body 58 is pressed to the lower side and the vehicle width direction inner side with a maximum pressing load equal to or larger than a total load of the predetermined load and the specified load. Therefore, the fitting of the restriction convex portion 40B of the restriction gear 40 into the restriction recessed portion 42B of the clutch plate 42 is released against the biasing force of the restriction spring 44 in the restriction mechanism 38, and the restriction gear 40 is rotated, so that the operating body 22 is rotated to one side, and the installation body 58 is rotated from the storage position to the lower side and the vehicle width direction inner side (see a two-dot chain line of the operating body 22 in FIG. 6A). In addition, the knob 54 of the return mechanism 48 is pressed to the vehicle width direction inner side by the storage stopper 26A of the contact plate 26 of the operating body 22, so that the pin 54A of the knob 54 is moved from the base end to the leading end of the first inner path 52A of the rail 52 in the knob case 50 against the biasing force of the return spring 56 in the return mechanism 48, and the knob 54 is moved to the vehicle width direction inner side from the initial position.

Figure 6B:
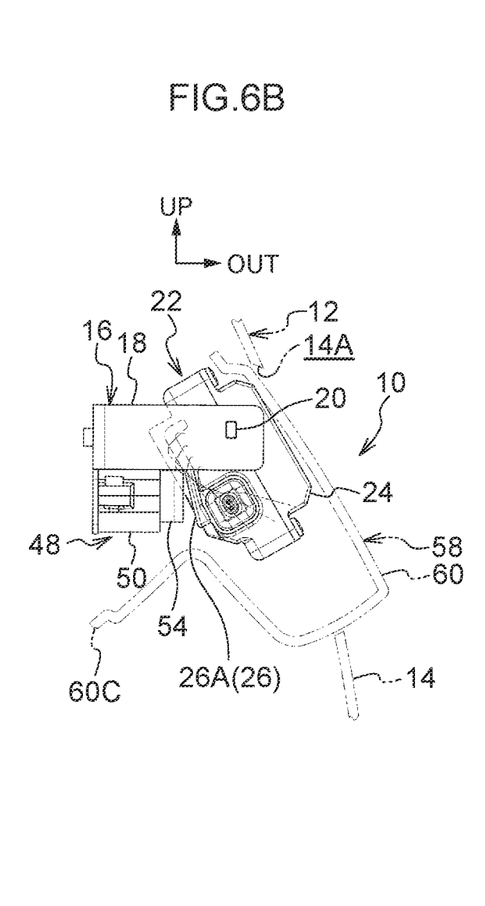
FIG. 6B is a rear view illustrating the camera apparatus according to the embodiment of the present invention in the middle of deployment of the installation body by the return mechanism, as viewed from the rear side of the vehicle.

Further, the pressing operation of the installation body 58 toward the lower side and the vehicle width direction inner side is released and the pressing operation of the knob 54 toward the vehicle width direction inner side is released, so that the pin 54A is moved from the leading end of the first inner path 52A to the leading end side of the first outer path 52B of the rail 52 by the biasing force of the return spring 56 in the return mechanism 48, and the knob 54 is moved to the vehicle width direction outer side of the initial position (see FIG. 6B). Therefore, the restriction convex portion 40B of the restriction gear 40 passes through the restriction recessed portion 42B of the clutch plate 42 against the biasing force of the restriction spring 44 in the restriction mechanism 38, and the restriction gear 40 is rotated, so that the operating body 22 is rotated to the other side, and the installation body 58 is rotated to the upper side and the vehicle width direction outer side of the storage position. As a result, the installation body 58 protrudes to the vehicle width direction outer side of the fender panel 14.

Figure 6C:
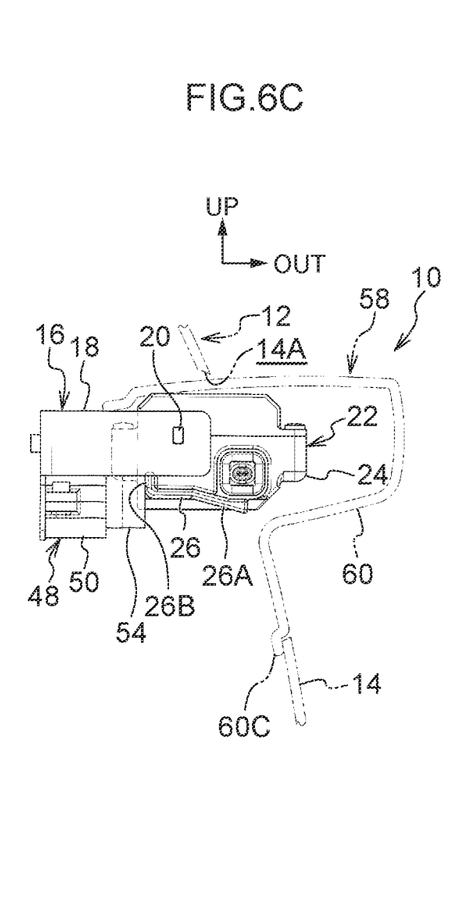
FIG. 6C is a rear view illustrating the camera apparatus according to the embodiment of the present invention when the installation body is deployed by a rotation operation, as viewed from the rear side of the vehicle.

In addition, the protruding portion of the installation body 58 from the fender panel 14 to the vehicle width direction outer side is rotated (for example, pulled) to the upper side and the vehicle width direction outer side, so that the restriction gear 40 is rotated against the biasing force of the restriction spring 44 in the restriction mechanism 38, the operating body 22 is rotated to the other side, and the installation body 58 is rotated to the upper side and the vehicle width direction outer side. Therefore, the installation body 58 is deployed (returned) (see FIG. 6C). When the operating body 22 is rotated to the other side and the installation body 58 is rotated to the upper side and the vehicle width direction outer side, the knob 54 is slid with respect to the contact plate 26 of the operating body 22 by the biasing force of the return spring 56 in the return mechanism 48, the pin 54A is moved in the first outer path 52B of the rail 52, and the knob 54 is moved in the vehicle width direction (see FIG. 6B). Further, when the installation body 58 is deployed, the pin 54A is moved to the leading end of the first outer path 52B by the biasing force of the return spring 56, and the vehicle width direction outer side surface of the knob 54 is in contact (surface contact) with the holding projection 26B of the contact plate 26, so that the installation body 58 is held at the deployment position (see FIG. 6C).

Thereafter, when the installation body 58 is pressed to the lower side and the vehicle width direction inner side with the maximum pressing load equal to or larger than the total load of the predetermined load and the specified load, the restriction convex portion 40B of the restriction gear 40 passes through the restriction recessed portion 42B of the clutch plate 42 against the biasing force of the restriction spring 44 in the restriction mechanism 38, and the restriction gear 40 is rotated, so that the operating body 22 is rotated to one side, and the installation body 58 is rotated to the lower side and the vehicle width direction inner side of the storage position (see a two-dot chain line of the operating body 22 in FIG. 6A). In addition, the knob 54 is pressed to the vehicle width direction inner side by the contact plate 26 of the operating body 22, so that the pin 54A is moved from the leading end of the first outer path 52B to the leading end of the second inner path 52C of the rail 52 against the biasing force of the return spring 56 in the return mechanism 48, and the knob 54 is moved to the vehicle width direction inner side of the initial position.

Furthermore, the pressing operation of the installation body 58 toward the lower side and the vehicle width direction inner side is released, and the pressing operation of the knob 54 toward the vehicle width direction inner side is released, so that the pin 54A is moved from the leading end of the second inner path 52C to the base end of the first inner path 52A via the second outer path 52D of the rail 52 by the biasing force of the return spring 56 in the return mechanism 48, and the knob 54 is moved (returned) to the initial position toward the vehicle width direction outer side (see a solid line in FIG. 6A). Therefore, the operating body 22 is rotated to the other side, and the installation body 58 is rotated to the upper side and the vehicle width direction outer side, so that the installation body 58 is disposed at the storage position. When the installation body 58 is disposed at the storage position, the restriction convex portion 40B of the restriction gear 40 is fitted into the restriction recessed portion 42B of the clutch plate 42 by the biasing force of the restriction spring 44 in the restriction mechanism 38, and the rotation of the restriction gear 40 is restricted, so that the rotation of the operating body 22 is restricted, and the rotation of the installation body 58 is restricted.

Here, as described above, when the installation body 58 is stored by the operation of the retractor 16 (when the restriction mechanism 38 restricts the rotation of the operating body 22 to restrict the rotation of the installation body 58), the installation body 58 is pressed to the lower side and the vehicle width direction inner side, and the knob 54 of the return mechanism 48 is pressed to the vehicle width direction inner side. Thereafter, the pressing operation of the installation body 58 toward the lower side and the vehicle width direction inner side is released, and the pressing operation of the knob 54 toward the vehicle width direction inner side is released, so that the knob 54 is moved to the vehicle width direction outer side of the initial position by the biasing force of the return spring 56 in the return mechanism 48, and the restriction convex portion 40B of the restriction gear 40 passes through the restriction recessed portion 42B of the clutch plate 42 against the biasing force of the restriction spring 44 in the restriction mechanism 38. Therefore, the restriction of the rotation of the operating body 22 by the restriction mechanism 38 is released by the return mechanism 48, and even in a case in which the retractor 16 cannot be operated when the installation body 58 is stored by the operation of the retractor 16, the operating body 22 can be rotated to the other side to deploy the installation body 58.

Further, when the installation body 58 is stored by the operation of the retractor 16, after the installation body 58 is pressed to the lower side and the vehicle width direction inner side and the knob 54 of the return mechanism 48 is pressed to the vehicle width direction inner side, the return mechanism 48 rotates the installation body 58 to the upper side and the vehicle width direction outer side of the storage position, and the installation body 58 protrudes to the vehicle width direction outer side of the fender panel 14. Therefore, even in a case in which the installation body 58 does not protrude to the vehicle width direction outer side of the fender panel 14 when the installation body 58 is stored by the operation of the retractor 16, the return mechanism 48 can easily deploy the installation body 58 by protruding the installation body 58 to the vehicle width direction outer side of the fender panel 14.

When the installation body 58 is stored by the operation of the retractor 16, the storage stopper 26A of the contact plate 26 of the operating body 22 is in contact with the knob 54 of the return mechanism 48, and the knob 54 stops the installation body 58 at the storage position. Therefore, the installation body 58 can be stopped at the storage position by the return mechanism 48 (knob 54), and it is not necessary to stop the installation body 58 at the storage position by an additional component other than the return mechanism 48, and the installation body 58 can be stopped at the storage position with a simple configuration. In addition, when the installation body 58 is stored by the operation of the retractor 16, the knob 54 can be easily pressed to the vehicle width direction inner side via the operating body 22 (storage stopper 26A) by pressing the installation body 58 to the lower side and the vehicle width direction inner side.

Further, when the installation body 58 is rotated and deployed, the vehicle width direction outer side surface of the knob 54 of the return mechanism 48 is in contact with the holding projection 26B of the contact plate 26 of the operating body 22 by the biasing force of the return spring 56 in the return mechanism 48, and the installation body 58 is held at the deployment position. Therefore, even in a case in which the restriction of the rotation of the operating body 22 by the restriction mechanism 38 is released when the installation body 58 is rotated and deployed, the installation body 58 can be held at the deployment position, and the lower camera 62 and the rear camera 64 can respectively capture images of the lower side and the vehicle rear side of the installation body 58.

In addition, when the installation body 58 is stored by the operation of the retractor 16, after the knob 54 of the return mechanism 48 is pressed to the vehicle width direction inner side by the pressing operation of the installation body 58 toward the lower side and the vehicle width direction inner side and the installation body 58 is deployed by the return mechanism 48 and the like, the knob 54 is pressed to the vehicle width direction inner side again by the pressing operation of the installation body 58 toward the lower side and the vehicle width direction inner side, and the knob 54 is returned to the initial position by the return mechanism 48. Therefore, the return mechanism 48 (knob 54) can be easily returned to the initial state (non-operation state).

Note that, in the present embodiment, the return mechanism 48 (knob 54) is indirectly operated via the installation body 58 and the operating body 22. However, the return mechanism 48 may be directly operated.

Further, in the present embodiment, the return mechanism 48 is mechanically operated by the biasing force of the return spring 56 by the operation of the return mechanism 48 (knob 54). However, the return mechanism 48 may be electrically operated by the operation of the return mechanism 48.

Further, in the present embodiment, when the installation body 58 is stored, the installation body 58 does not protrude to the vehicle width direction outer side of the fender panel 14. However, when the installation body 58 is stored, the installation body 58 may protrude to the vehicle width direction outer side of the fender panel 14.

Furthermore, in the present embodiment, the rotation shaft (shaft 20) of the installation body 58 is provided on the upper side of the installation body 58, so that the installation body 58 is rotated to the lower side and the vehicle width direction inner side and stored, and the installation body 58 is rotated to the upper side and the vehicle width direction outer side and deployed. However, by providing the rotation shaft of the installation body 58 on the lower side of the installation body 58, the installation body 58 may be rotated to the upper side and the vehicle width direction inner side and stored, and the installation body 58 may be rotated to the lower side and the vehicle width direction outer side and deployed.

In the present embodiment, the installation body 58 is rotated. However, the installation body 58 may be slid.

Further, in the present embodiment, the installation body 58 is provided with the two imaging devices (the lower camera 62 and the rear camera 64). However, one or three or more imaging devices may be provided in the installation body 58.

Further, in the present embodiment, a light irradiation device such as a turn lamp may be provided in the installation body 58, and a detection device such as a radar may be provided in the installation body 58.

Further, in the present embodiment, the camera apparatus 10 is installed on the fender panel 14 of the vehicle 12. However, the camera apparatus 10 may be installed in a portion other than the fender panel 14 of the vehicle 12.

The disclosure of Japanese Patent Application No. 2020-34191 filed on Feb. 28, 2020 is incorporated herein by reference in its entirety.

REFERENCE SIGNS LIST

10 camera apparatus (installation apparatus)
12 vehicle
16 retractor (operating device)
38 restriction mechanism
48 return mechanism (release mechanism)
58 Installation body
62 lower camera (imaging device)
64 rear camera (imaging device)

The invention claimed is:

1. An installation apparatus, comprising:
an installation body that is installed at a vehicle;
an imaging device that is provided at the installation body and captures an image of the outside of the installation body;
an operating device that is operated so that the installation body is moved to store or deploy, and that is provided with a restriction mechanism for restricting movement of the installation body when the operating device is not operated; and
a release mechanism that is operated by a load being applied to the installation body towards a storage direction so that the movement restriction of the installation body by the restriction mechanism is released to permit the installation body to move further towards a deployment position side than a movement restriction position.

2. The installation apparatus according to claim 1, wherein, when the installation body is stored, the installation body is stored inside the vehicle, and the release mechanism is operated to move the installation body to a deployment position side.

3. The installation apparatus according to claim 1, wherein the release mechanism stops movement of the installation body when the operating device is operated.

4. The installation apparatus according to claim 1, wherein the release mechanism holds a position of the installation body when the release mechanism is operated.

5. The installation apparatus according to claim 1, wherein the release mechanism is operated a plurality of times and returns to a non-operation state.

6. The installation apparatus according to claim 1, wherein an operation load on the release mechanism is larger than a movement restriction load on the installation body by the restriction mechanism.

7. The installation apparatus according to claim 1, wherein a load with which the release mechanism moves the installation body when the release mechanism is operated is larger than a movement restriction load on the installation body by the restriction mechanism.

8. The installation apparatus according to claim 1, wherein the release mechanism is operated via at least one of the installation body or the operating device.

9. The installation apparatus according to claim 1, wherein the restriction mechanism restricts movement of the installation body by a biasing force.

10. The installation apparatus according to claim 1, wherein the release mechanism moves the installation body by a biasing force when the release mechanism is operated.

11. The installation apparatus according to claim 1, wherein the release mechanism is operated to move the installation body to the deployment position side.

12. An installation apparatus, comprising:
an installation body that is installed at a vehicle;
an imaging device that is provided at the installation body and captures an image of the outside of the installation body;
an operating device that is operated so that the installation body is moved to store or deploy, and that is provided with a restriction mechanism for restricting movement of the installation body when the operating device is not operated; and
a release mechanism that is operated so that the movement restriction of the installation body by the restriction mechanism is released to permit the installation body to move further towards a deployment position side than a movement restriction position,
wherein an operation load on the release mechanism is larger than a movement restriction load on the installation body by the restriction mechanism.

13. An installation apparatus, comprising:
an installation body that is installed at a vehicle;
an imaging device that is provided at the installation body and captures an image of the outside of the installation body;
an operating device that is operated so that the installation body is moved to store or deploy, and that is provided with a restriction mechanism for restricting movement of the installation body when the operating device is not operated; and
a release mechanism that is operated so that the movement restriction of the installation body by the restriction mechanism is released to permit the installation body to move further towards a deployment position side than a movement restriction position,
wherein a load with which the release mechanism moves the installation body when the release mechanism is operated is larger than a movement restriction load on the installation body by the restriction mechanism.

14. An installation apparatus, comprising:
an installation body that is installed at a vehicle;
an imaging device that is provided at the installation body and captures an image of the outside of the installation body;
an operating device that is operated so that the installation body is moved to store or deploy, and that is provided with a restriction mechanism for restricting movement of the installation body when the operating device is not operated; and a release mechanism that is operated so that the movement restriction of the installation body by the restriction mechanism is released to permit the installation body to move further towards a deployment position side than a movement restriction position, wherein the release mechanism moves the installation body by a biasing force when the release mechanism is operated.

* * * * *